United States Patent
Greene

(10) Patent No.: US 7,370,836 B2
(45) Date of Patent: *May 13, 2008

(54) MISSILE DEFENSE SYSTEM AND METHODS FOR EVADING HEAT SEEKING MISSILES

(76) Inventor: Leonard M. Greene, 1010 Greacen Point Rd., Mamaroneck, NY (US) 10543

( * ) Notice: Subject to any disclaimer, the term of this patent is extended or adjusted under 35 U.S.C. 154(b) by 290 days.

This patent is subject to a terminal disclaimer.

(21) Appl. No.: 11/199,268

(22) Filed: Aug. 9, 2005

(65) Prior Publication Data

US 2007/0034072 A1 Feb. 15, 2007

(51) Int. Cl.
*G05D 1/00* (2006.01)
(52) U.S. Cl. ............... 244/195; 244/17.13; 89/1.11
(58) Field of Classification Search ........... 244/195, 244/17.11, 136, 17.13; 701/3; 89/1.11
See application file for complete search history.

(56) References Cited

U.S. PATENT DOCUMENTS

| | | | | |
|---|---|---|---|---|
| 3,150,848 A | * | 9/1964 | Lager | 244/3.16 |
| 3,969,890 A | * | 7/1976 | Nelson | 60/39.15 |
| 4,947,334 A | * | 8/1990 | Massey et al. | 701/3 |
| 4,959,015 A | * | 9/1990 | Rasinski et al. | 434/2 |
| 5,001,646 A | * | 3/1991 | Caldwell et al. | 701/7 |
| 5,403,155 A | * | 4/1995 | Head et al. | 416/25 |
| 5,430,448 A | * | 7/1995 | Bushman | 342/52 |
| 5,662,291 A | * | 9/1997 | Sepp et al. | 244/3.13 |
| 5,738,300 A | * | 4/1998 | Durand | 244/17.13 |
| 6,055,804 A | * | 5/2000 | Hammond et al. | 60/39.5 |
| 6,122,907 A | * | 9/2000 | Frawley | 60/264 |
| 6,344,700 B1 | * | 2/2002 | Eisenhauer et al. | 307/64 |
| 6,352,031 B1 | * | 3/2002 | Barbaccia | 102/365 |
| 6,584,759 B1 | * | 7/2003 | Heap | 60/39.44 |
| 6,619,178 B1 | * | 9/2003 | Fransson et al. | 89/1.51 |
| 6,662,700 B2 | * | 12/2003 | O'Neill | 89/1.11 |
| 6,738,012 B1 | * | 5/2004 | Kirkpatrick | 342/67 |
| 6,785,610 B2 | * | 8/2004 | Baker et al. | 701/301 |
| 6,885,917 B2 | * | 4/2005 | Osder et al. | 701/3 |
| 6,977,598 B2 | * | 12/2005 | Longbottom | 340/945 |
| 7,082,769 B2 | * | 8/2006 | Greene | 60/778 |
| 7,195,200 B2 | * | 3/2007 | Yamane | 244/76 R |
| 7,212,148 B1 | * | 5/2007 | Torres | 342/13 |
| 2005/0056724 A1 | * | 3/2005 | Greene | 244/10 |
| 2005/0204910 A1 | * | 9/2005 | Padan | 89/1.813 |
| 2005/0230563 A1 | * | 10/2005 | Corcoran, III | 244/175 |
| 2006/0000988 A1 | * | 1/2006 | Stuart et al. | 250/504 R |
| 2006/0058928 A1 | * | 3/2006 | Beard et al. | 701/11 |
| 2006/0096493 A1 | * | 5/2006 | Swanson | 102/505 |
| 2006/0138277 A1 | * | 6/2006 | Franceschini et al. | 244/17.13 |
| 2006/0249009 A1 | * | 11/2006 | Rubin | 89/1.11 |
| 2007/0022757 A1 | * | 2/2007 | Zack et al. | 60/772 |

* cited by examiner

*Primary Examiner*—Peter M. Poon
*Assistant Examiner*—Joseph W Sanderson
(74) *Attorney, Agent, or Firm*—Lowe Hauptman Ham & Berner, LLP

(57) ABSTRACT

A method for aiding a helicopter pilot to avoid a heat seeking missile includes the step of detecting a threat from a missile. The method also includes the step of reducing heat emanating from the helicopter's engine and rapidly reducing altitude. Then, when the threat has passed flight is resumed. A system for accomplishing the above is also described which simultaneously reduces engine temperature, deflects the exhaust gases, injects water into the exhaust gases, reduces altitude and launches a countermeasure.

13 Claims, 3 Drawing Sheets

MISSILE DEFENSE SYSTEM AND METHODS FOR EVADING HEAT SEEKING MISSILES

FIELD OF THE INVENTION

This invention relates to a missile defense system and methods for evading heat seeking missiles and more particularly to methods and systems for reducing exhaust and engine temperature and rapidly changing altitude in a helicopter.

BACKGROUND FOR THE INVENTION

Representatives of the U.S. government, the airline industry and aircraft pilots recognize that terrorists may attempt to fire a surface to air missile such as a man-portable air defense system (MANPADS) at a commercial or civil aircraft. As reported in an International Federation of Airline Pilot's Association, and Security Bulletin of 31 Mar. 2003, the FAA issued a notice that states in part that there is no credible evidence that terrorists have smuggled MANPADS into the United States. Nevertheless, the potential for such a threat does exist. The threat is exacerbated by a large number of unaccounted for MANPADS many of which may be in the hands of terrorist organizations.

In view of the threat, the Department of Homeland Security on Oct. 3, 2003 issued a solicitation RA-02 for a Counter-Man-Portable Air Defense System. As reported therein, the Department of Homeland Security "is initiating a program for the development of an anti missile device for commercial aircraft." The Department of Homeland Security also identified an on-board jamming (directed infrared counter measure (DIRCM) as the most promising existing technology which is capable of good performance against the current and emerging threats while potentially satisfying operational constraints.

Then on Jan. 7, 2004, the Washington Post reported that "the Department of Homeland Security which has identified shoulder fired missiles as threats to commercial aircraft, chose three companies to develop anti missile technology." As reported, the government proposal calls for adapting military technology to commercial planes—a concept of which many are skeptical.

There are serious problems associated with adopting military technology to commercial aircraft. For example, the cost for equipping each aircraft has been estimated to be about 5 million dollars. Further, the cost for equipping 6,800 plus commercial jets with such systems has been estimated at between 7 to 10 billion dollars. Even at that cost, corporate jet and other non-commercial aircraft would be unprotected.

An additional problem with military technology relates to the deployment of flares to divert a heat seeking missile. The deployment of flares over heavily populated areas could cause fires and/or death on the ground. Further, there is little or no need to protect the aircraft at altitudes beyond the range of present day or envisioned man-portable or shoulder launched surface to air missiles.

It is now believed that a pilot of an airborne aircraft may be able to avoid being struck by a heat seeking missile by a method and/or system in accordance with the present invention. The method involves three key steps which are executed essentially simultaneously to protect the aircraft from an incoming heat seeking missile.

BRIEF SUMMARY OF THE INVENTION

In essence, the present invention contemplates a method and/or system for aiding an airborne pilot to avoid being struck by a heat seeking missile. The method includes a first step of detecting a launch or threat of a heat seeking missile which may be done with a conventional defense against such missiles. Then, after detection of an incoming missile, the pilot immediately reduces the heat emanating from the engine as for example, by reducing the engine speed to idle and/or injecting a mass of water into the exhaust duct to produce a steam cloud and to rapidly lower the temperature. At the same time, the altitude of the aircraft is rapidly reduced. Then after the missile threat has passed, the pilot resumes flight as for example, by increasing engine speed and lift of the aircraft.

A second embodiment of the invention contemplates a system for detecting a threat by a heat seeking missile and almost immediately and automatically reduces engine speed to reduce the heat of the exhaust and simultaneously initiates auto rotation or other maneuver to cause the aircraft to rapidly drop to a lower altitude. The system also includes means to increase engine speed and lift for resuming flight after the threat has passed. This latter means may be manually initiated by the pilot who may override the system at any time.

The invention will now be described in connection with the accompanying drawings wherein like reference numerals have been used to designate like steps.

DESCRIPTION OF THE PREFERRED EMBODIMENTS OF THE INVENTION

Figure 1:
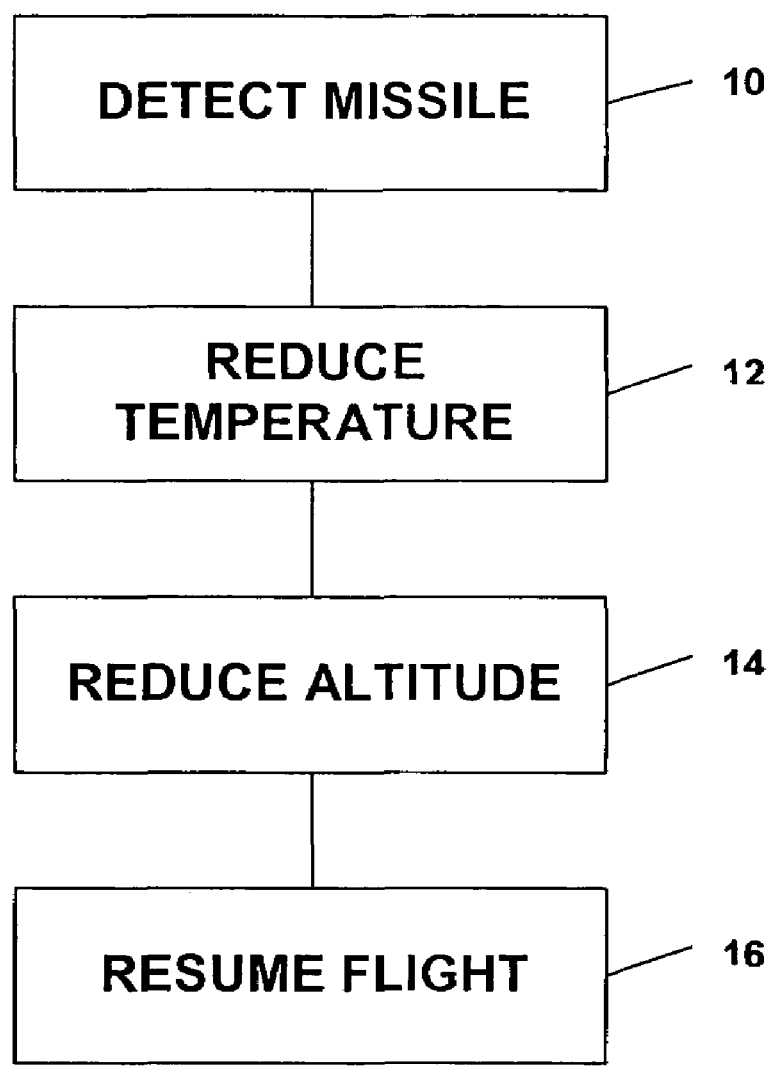
FIG. 1 is a block diagram illustrating a method for aiding a pilot to avoid being struck by a heat seeking missile in accordance with a first embodiment of the invention.

A method for aiding a pilot of an aircraft such as a helicopter to avoid being struck by a heat seeking missile in accordance with a first embodiment of the invention is illustrated in FIG. 1. As illustrated, the method includes the step 10 of detecting a threat by a heat seeking missile. The threat is detected by conventional means. For example, missile approach warning systems have been used by the military for some time. Such systems warn of a missile actually targeting the aircraft and are designed to enable the use of evasive maneuvers, electronic warfare and infrared countermeasures.

In a second step 12 a pilot immediately reduces the heat output of the engine as for example, by reducing the engine speed to idle. The heat output of the engine or engines can be reduced by other steps as will be described in connection with a second embodiment of the invention. This reduction in heat is done in an effort to disrupt a missile's guidance system particularly in view of a third step in this embodiment of the invention.

In a third step 14, the pilot immediately reduces altitude as for example in a helicopter, by rapidly pushing the collective down. The pilot allows the aircraft to auto rotate which has the effect of producing a sharp dive. The altitude may be reduced by 300 feet more or less based on the altitude of the helicopter at the time of a missile detection. After the missile threat has passed, the pilot increases lift in step 16 to regain the lost altitude and resume flight.

Figure 2:
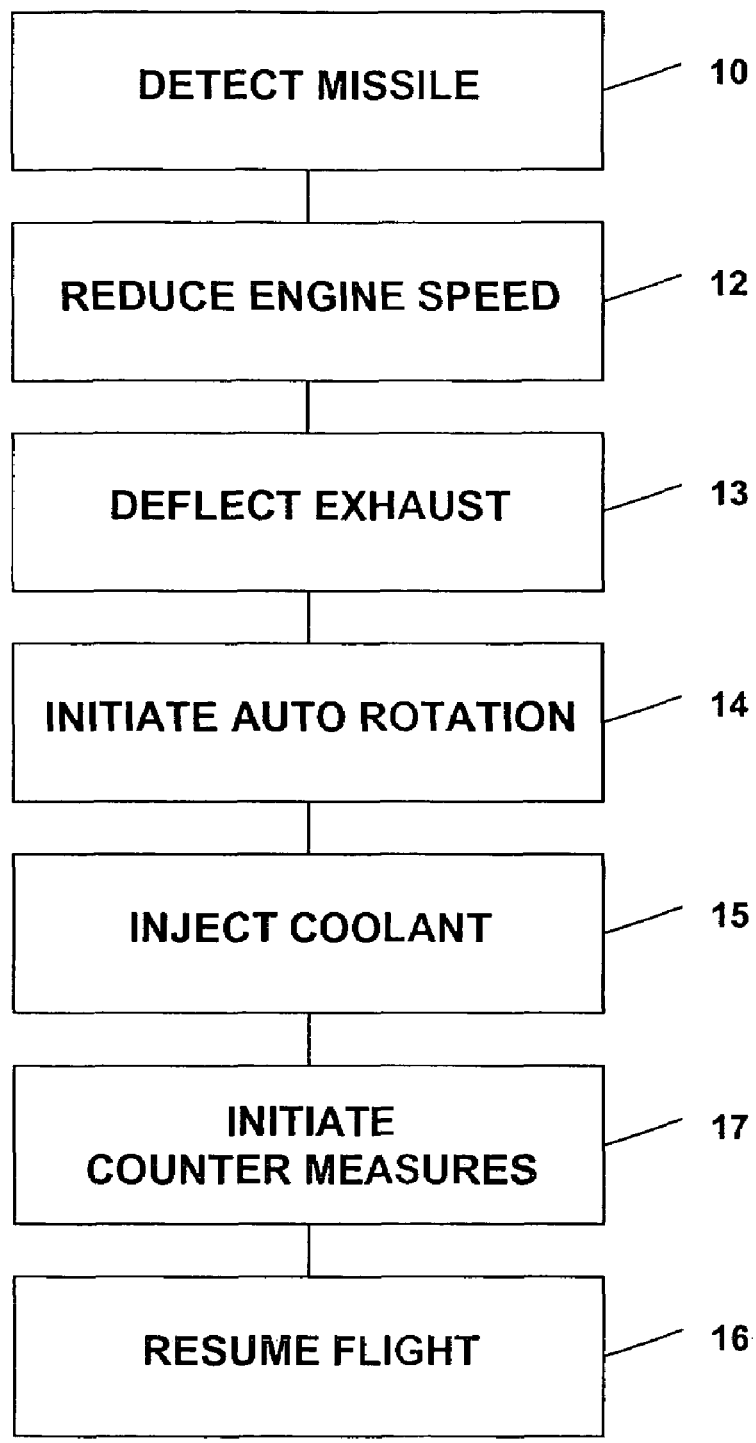
FIG. 2 is a block diagram illustrating a method for aiding a pilot to avoid being struck by a heat seeking missile in accordance with a second embodiment of the invention.

FIG. 2 illustrates a second embodiment of the invention wherein the steps 10 and 12 are essentially the same as in the first embodiment of the invention. However, step 12 may be eliminated if the helicopter has insufficient altitude or speed to avoid a crash. In this embodiment of the invention, the pilot in step 13 deflects the exhaust gases by rotating a deflector plate to deflect the exhaust gases upward by about 45 degrees. The deflector plate can be made of any suitable heat resistant material such as a carbon-carbon composite which is relatively light. The deflector plate is activated by any simple mechanism for rotating the plate which is disposed immediately below the normal path of the exhaust gas and rotates upwardly into the gases to deflect them upwardly.

It is presently believed that deflecting the hot gases upwardly, as for example, toward the rotor will cause the hot gases to dissociate. It is believed that this cooling will further disrupt the missile's guidance system. In a further step 15, a mass of water as for example, 8 gallons more or less is ejected into the hot exhaust. The water is converted to steam by the hot gases which cools the gases. At essentially the same time, the collective is pushed down to provide auto rotation in step 14 to provide a rapid decrease in altitude. It is believed that this rapid cooling of the engine exhaust gases and rapid drop-in altitude will confuse the missile guidance system. In effect, the helicopter will seem to disappear. Then the helicopter will be capable of increasing lift and resuming flight in step 16 when the threat of a missile has passed. It is also contemplated that the pilot may at the same time initiate one or more countermeasures in step 17.

The mass of water is injected into the exhaust as for example, into an exhaust duct or housing or immediately behind the housing and into the flow of hot exhaust gases while avoiding direct contact with the engine. It is believed that the water contact with the hot exhaust will result in an explosion of steam rapidly cooling the engine and allow the helicopter to drop out of the resulting cloud of steam and in effect disappear from the missile's guidance system. By reducing the engine speed to its lowest sustainable speed and electing auto rotation, the helicopter will in effect drop like a rock out of the cloud of steam and after a preselected distance the engine speed and lift can be increased without the need to restart an engine after the missile threat has passed.

Figure 3:
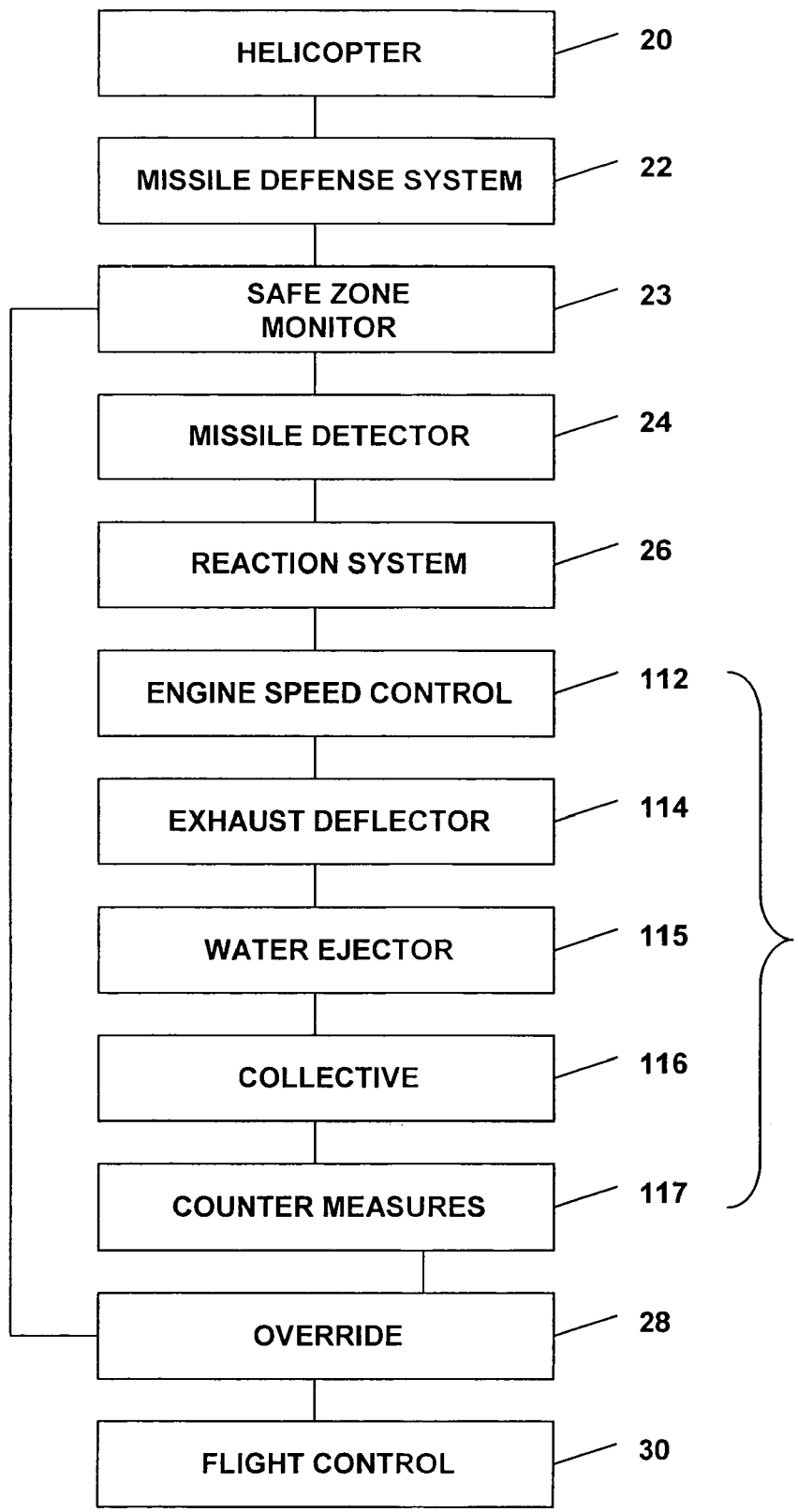
FIG. 3 is a block diagram illustrating a missile defense system for a helicopter in accordance with a third embodiment of the invention.

A third embodiment of the invention is illustrated in FIG. 3. As illustrated therein, a helicopter 20 includes a missile defense system 22 for protecting the aircraft from a strike by a heat seeking missile. In its preferred form, the missile defense system 22 includes means 23 for monitoring a safe zone. The safe zone is based on altitude, airspeed and the gross weight of the helicopter and allows the initiation of each of the steps as a defense without causing the aircraft to crash. Whether or not the helicopter is operating within a safe zone is disclosed and described in my co-pending application entitled "Methods For Evading Heat Seeking Missiles," filed on even date herewith. Nevertheless, the defense system 20 activates means 24 for detecting a threat from a heat seeking missile irrespective of whether or not the aircraft is flying in a safe zone.

The system 22 also includes simultaneous means 26 for simultaneously taking a number of steps to avoid being struck by a heat seeking missile. Accordingly, the system 20 includes means 112 for reducing the engine temperature as for example, by reducing the engine speed to idle. In addition, the system 22 includes means 114 for deflecting and disassociating the hot exhaust gases as for example by a deflector plate. A deflector plate is positioned with respect to the engine exhaust and constructed and arranged to deflect hot exhaust gases upwardly at an angle of about 45 degrees. The deflected hot gases may then be further dissociated by the helicopter's rotating blades. Further the means 26 activates means 115 for injecting water into the hot exhaust gases which convert the water to steam and reduce the exhaust temperature. At essentially the same time as deflecting the exhaust gases and injecting water into the exhaust gases, the system 22 activates means 114 for rapidly reducing the altitude of the helicopter as for example, by pushing the collective down and initiating auto rotation. In addition, means 117 for launching a countermeasure or counter attack may be activated in an attempt to avoid being struck by the incoming missile.

In practice, the engine speed reduction, water injection, exhaust deflection and altitude reduction take place almost simultaneously as for example, within microseconds of one another. Considering that an aircraft may have as little as three seconds more or less from detecting a missile until a strike, the system including any means for countermeasures should take place almost instantaneously.

Countermeasures against an incoming heat seeking missile are known. For example, an AN/ALQ-156(b)3 missile approach detector is defined as an airborne radar system that provides infrared homing protection. The detector detects the approach of an anti-aircraft missile. Then when an approaching missile is detected, the missile detector automatically triggers an M-130 the generally purpose dispenser system which releases a flare as a decoy. Other known countermeasures may also be taken at the same time.

As suggested above, the system may include an auto override system 28 to prevent a reduction in altitude or other step that would cause the aircraft to crash. This override system 28 is tied to the means 23 for monitoring a safe zone and may be independently activated by the pilot who is ultimately responsible for the aircraft and its passengers. Finally, the system 22 includes means 30 for resuming flight.

While the invention has been described in connection with its preferred embodiments, it should be recognized that changes and modifications may be made therein without departing from the scope of the appended claims.

What is claimed is:

1. A method for aiding a pilot to avoid being struck by a heat seeking missile, said method comprising the steps of:
   detecting a threat of a heat seeking missile;
   providing a computer for automatically reducing the heat emanating from a helicopter engine upon detection of the threat by a heat seeking missile;
   automatically rapidly reducing altitude; and
   automatically resuming flight when the missile threat has passed.

2. A method for aiding a pilot to avoid being struck by a heat seeking missile according to claim 1, in which the heat emanating from the engine is reduced by reducing power.

3. A method for aiding a helicopter pilot to avoid being struck by a heat seeking missile according to claim 2, which includes the step of deflecting hot exhaust gases.

4. A method for aiding a pilot to avoid being struck by a heat seeking missile according to claim 2, which includes the step of dissociating the hot exhaust gases.

5. A method for aiding a pilot to avoid being struck by a heat seeking missile according to claim 2, which includes the step of injecting water into the hot exhaust gases.

6. A method for aiding a pilot to avoid being struck by a heat seeking missile according to claim 3, which includes the step of injecting water into the hot exhaust gases.

7. A method for aiding a pilot to avoid being struck by a heat seeking missile according to claim 4, which includes the step of injecting water into the hot exhaust gases.

8. A method for aiding a pilot to avoid being struck by a heat seeking missile according to claim 3, in which the hot exhaust gases are deflected upwardly.

9. A method for aiding a pilot to avoid being struck by a heat seeking missile according to claim 1, in which the altitude of the aircraft is reduced by auto rotation.

10. A method for aiding a pilot to avoid being struck by a heat seeking missile according to claim 2, which includes the steps of deflecting the hot exhaust gases, injecting water into the hot gases in which the steps of reducing the heat emanating from the engine, deflecting the hot exhaust gases and injecting water into the hot gases are done simultaneously.

11. A method for aiding a pilot to avoid being struck by a heat seeking missile according to claim 10, which includes the steps of establishing a safe zone based on the speed, altitude and weight of the aircraft, monitoring a safe zone and preventing a rapid reduction in altitude when the aircraft is outside of the safe zone.

12. A missile defense system in a helicopter for avoiding a strike by a heat seeking missle, said system comprising:
    means for detecting a threat by a heat seeking missile;
    means for reducing the heat emanating from a helicopter's engine upon detection of a threat by a heat seeking missile including a computer for automatically reducing the speed of the engine upon detection of a threat by a missle;
    means for deflecting hot exhaust gasses upwardly toward a helicopter's rotor;
    means for injecting a mass of water into the hot exhaust gasses;
    means for rapidly reducing the altitude of the aircraft by auto rotation;
    means for simultaneously activating said means for reducing the heat emminating from a helicopter's engine upon detection of a threat by a heat seeking missile, said means for rapidly reducing the altitude of the helicopter, said means for deflecting the hot exhaust gasses upwardly and said means for injecting a mass of water into the hot exhaust gasses; and,
    means for establishing a safe zone based on the altitude, speed and weight of the helicopter and for deactivating the means for rapidly reducing altitude when the helicopter is outside of the safe zone.

13. A method for aiding a helicopter pilot to avoid being struck by a heat seeking missile, said method comprising the steps of:
    establishing and monitoring a safe zone based on altitude, airspeed and gross weight of a helicopter;
    detecting a threat by a heat seeking missile;
    providing a computer for automatically reducing the heat emanating from the helicopter engine;
    automatically rapidly reducing the altitude of the helicopter within the safe zone; and
    automatically resuming flight when the missile threat has passed.

* * * * *